(12) United States Patent
Galbraith et al.

(10) Patent No.: US 8,736,997 B2
(45) Date of Patent: *May 27, 2014

(54) IMPLEMENTING COMBINED PHASE AND AMPLITUDE MAGNETIC DEFECT DETECTION ON-THE-FLY

(75) Inventors: Richard Leo Galbraith, Rochester, MN (US); Weldon Mark Hanson, Rochester, MN (US); Martin Aureliano Hassner, Mountain View, CA (US); Travis Roger Oenning, Rochester, MN (US); Satoshi Yamamoto, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 69 days.

This patent is subject to a terminal disclaimer.

(21) Appl. No.: 13/495,903

(22) Filed: Jun. 13, 2012

(65) Prior Publication Data

US 2013/0335841 A1 Dec. 19, 2013

(51) Int. Cl.
*G11B 27/36* (2006.01)
*G11B 5/02* (2006.01)
*G11B 20/06* (2006.01)
*G11B 20/08* (2006.01)

(52) U.S. Cl.
USPC .............................................. 360/31; 360/29

(58) Field of Classification Search
None
See application file for complete search history.

(56) References Cited

U.S. PATENT DOCUMENTS

| 6,088,176 | A | 7/2000 | Smith et al. | |
|---|---|---|---|---|
| 6,657,809 | B2 * | 12/2003 | Ottesen et al. | 360/77.03 |
| 7,929,235 | B2 | 4/2011 | Meier et al. | |
| 2008/0304594 | A1 * | 12/2008 | Schell et al. | 375/300 |
| 2013/0100550 | A1 * | 4/2013 | Galbraith et al. | 360/39 |

OTHER PUBLICATIONS

U.S. Appl. No. 13/277,047, filed Oct. 19, 2011 to Richard Leo Galbraith et al, entitled: "Implementing Magnetic Defect Classification Using Phase Modulation".

* cited by examiner

*Primary Examiner* — Regina N Holder
(74) *Attorney, Agent, or Firm* — Joan Pennington

(57) ABSTRACT

A method, apparatus, and system are provided for implementing magnetic defect location detection on-the-fly for hard disk drives. A magnetic media readback signal of a hard disk drive is demodulated to generate phase modulation (PM) and amplitude modulation (AM) signals. A new coordinate plane defined by a combined phase modulation (PM) and amplitude modulation (AM) phasor-defect detector calculation function used to locate magnetic defects on-the-fly.

20 Claims, 12 Drawing Sheets

112

202 CORDIC Output
$k$-th Sample CORDIC-Coordinates
$\{m_k, sin(\phi_k), cos(\phi_k)\}$
In absence of defect AM-$m_k$ is normalized to 1

204 Coordinate Converter
$$cosh(ln(m_k) + j\phi_k) = u_k + jv_k$$
$$u_k = cos(\phi_k)cosh(ln(m_k)) = cos(\phi_k)\frac{m_k + \frac{1}{m_k}}{2}$$
$$v_k = sin(\phi_k)sinh(ln(m_k)) = sin(\phi_k)\frac{m_k - \frac{1}{m_k}}{2}$$

206 Detection Plane
$$\frac{u^2}{cos^2(\phi_k)} - \frac{v^2}{sin^2(\phi_k)} = 1, \phi_k\text{-Hyperbola}$$
$$\frac{u^2}{(m_k + \frac{1}{m_k})^2} + \frac{v^2}{(m_k - \frac{1}{m_k})^2} = 1, m_k\text{-Ellipse}$$

- Combined AM/PM Phasor-Defect Detector

208 $d_k = ((u_k - 1)^2 + v_k^2)^{1/2} = \frac{1}{2}(m_k + 1/m_k) - cos(\phi_k)$

222 (1) If dk > Criteria1; Criteria1 = 1.0 → Three Pulses (2) If dk > Criteria2; Criteria2 = 0.45 → One Pulse (3) If # of Pulse > Criteria3 in +/-24 samples → Make this +/-24 samples as Defect Window
Criteria3 = 3

IMPLEMENTING COMBINED PHASE AND AMPLITUDE MAGNETIC DEFECT DETECTION ON-THE-FLY

FIELD OF THE INVENTION

The present invention relates generally to the data storage field, and more particularly, relates to a method, apparatus, and system for implementing magnetic defect location detection on-the-fly using combined phase modulation and amplitude modulation phasor-defect detector for hard disk drives.

DESCRIPTION OF THE RELATED ART

In hard disk drives (HDDs) magnetoresistive (MR) sensors typically are used to sense magnetic patterns of data recorded on a writable disk surface. MR sensors detect the magnetic field strength changes (DH) experienced by the magnetic sensor while passing over magnetically written bits on the spinning magnetic disk media, and directly convert the detected DH to an electrical signal with a time-varying voltage level (DV), which can be converted into data bits by the read channel electronics.

Magnetic disk media defects including bumps or thermal-asperity (TA) defects and pits or hole defects limit the effective use of the magnetic disk media.

U.S. Pat. No. 7,929,235 issued Apr. 19, 2011 to Meier et al., discloses a method and system for distinguishing spatial or pit defects and bumps or thermal defects on perpendicular media. The magnetic domains of the perpendicular media are oriented to have a first polarity, scanned using a read head, oriented to have a second polarity and scanned again. The signals from the read head are combined to produce output signals having improved signal to noise ratios from which the locations of spatial and thermal defects can be identified and distinguished. FIGS. 2A and 2B respectively show a pit defect and amplitude of readback signal when reading over the pit. FIGS. 8A-8D compare AM readback signals of pit and bump defects.

U.S. Pat. No. 6,088,176 issued Jul. 11, 2000 to Smith et al., discloses an apparatus and method for separating magnetic and thermal components from an MR signal with reading an information signal from a magnetic storage medium using a magnetoresistive (MR) head, and separating a thermal signal component and, if present, a magnetic signal component from the information signal. Head-to-disk spacing change using a thermal signal to detect disk surface defects, topographic variations, and servo control surface variations. FIG. 7 illustrates a pit and bump example with a thermal response voltage level. FIGS. 19A-C show waveforms with less readback signal amplitude caused by a disk surface pit. FIG. 20 provides a bump example with magnetic and thermal response voltage level response from a TA event. A classification circuit/filter using thermal response signal amplitude differences is shown if FIG. 23.

The prior Art describes defect detection method exclusively defined by read-back signal amplitude drop. A need thus exists to enhance the defect detection SNR by using both Amplitude and Phase Modulations caused by defect. SNR enhancement of defect detection will decrease the extensive test time required for conventional media surface analysis test (SAT). It is desirable to provide a mechanism to allow for efficient and effective magnetic defect detection with improved detectability and reliability substantially without negative effect.

SUMMARY OF THE INVENTION

Aspects of the present invention are to provide a method, apparatus, and system for implementing magnetic defect location detection for hard disk drives. Other important aspects of the present invention are to provide such method, apparatus, and system substantially without negative effect and to overcome some of the disadvantages of prior art arrangements.

In brief, a method, apparatus, and system are provided for implementing magnetic defect location detection on-the-fly for hard disk drives. A magnetic media readback signal of a hard disk drive is demodulated to generate phase modulation (PM) and amplitude modulation (AM) signals. A new coordinate plane is defined by a combined phase modulation (PM) and amplitude modulation (AM) phasor-defect detector calculation function used to locate magnetic defects on-the-fly.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2A, 2B, and 2C respectively illustrates example defect detection operations for magnetic defect location using a combined phase modulation (PM) and amplitude modulation (AM) phasor-defect detector; a new coordinate plane to locate magnetic defects on-the-fly for hard disk drives (HDDs); and a defect window function to locate magnetic defects on-the-fly for HDDs in accordance with an embodiment of the invention;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the embodiments of the invention, a method, apparatus, and system are provided for implementing magnetic defect location detection on-the-fly using a combined phase modulation and amplitude modulation phasor-defect detector for hard disk drives. The system implements magnetic defect location detection on-the-fly, avoiding the extensive test time required for conventional media surface analysis test (SAT), and providing efficient and effective magnetic defect detection with improved detectability and reliability.

Figure 1:
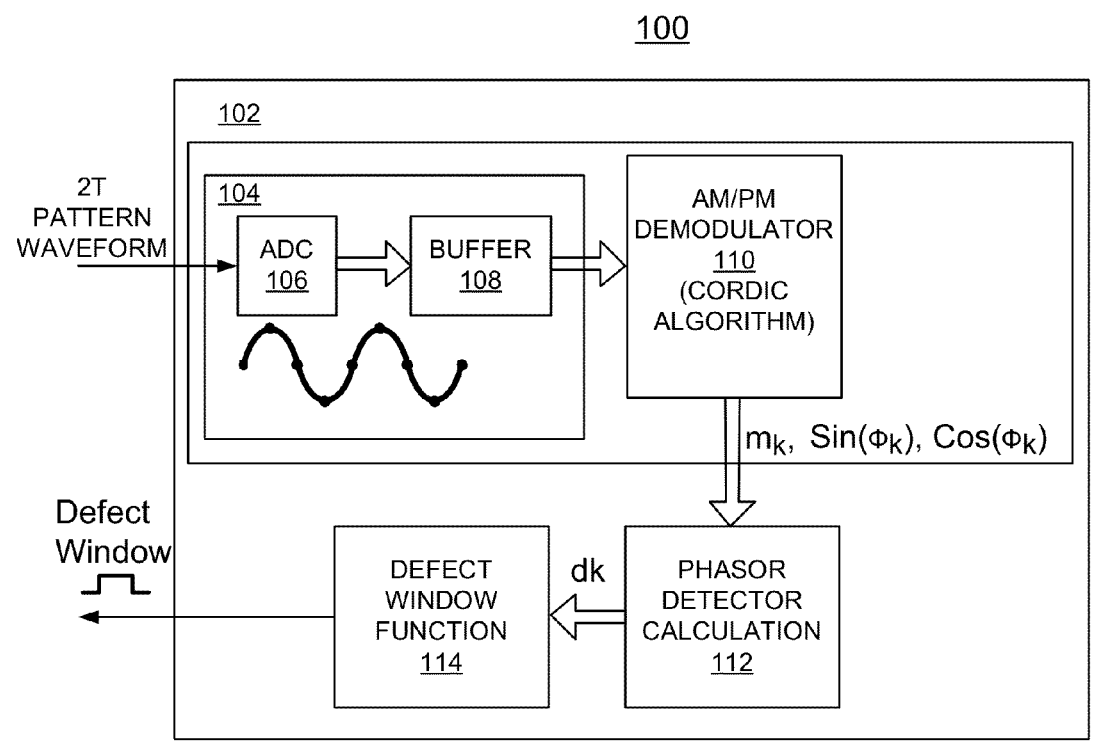
FIG. 1 is a block diagram representation illustrating a system for implementing magnetic defect location detection on-the-fly for hard disk drives (HDDs) in accordance with an embodiment of the invention.

Having reference now to the drawings, in FIG. 1, there is shown a system for implementing magnetic defect location detection on-the-fly for hard disk drives (HDDs) generally designated by the reference character 100 in accordance with an embodiment of the invention.

As shown in FIG. 1, system 100 includes read/write channel hardware 102 including a 2T pattern front-end signal processing circuit 104. A 2T pattern readback signal, where 1/T is the sample rate, is captured by a read head and applied to an analog-to-digital converter (ADC) 106. The 2T pattern front-end signal processing circuit 104 includes the analog-to-digital converter (ADC) 106, a buffer 108, and an AM/PM Demodulator 110, for example, implemented by Discrete Fourier Transform (DFT) signal processing or a CORDIC algorithm. For the purpose of description the AM/PM Demodulator 110 is assumed to be a CORDIC algorithm function 110. The CORDIC algorithm function 110 receives the ADC readback samples and generates Phase Modulation (PM) signals represented by $\cos(\Phi_k)$, $\sin(\Phi_k)$, and Amplitude Modulation (AM) signals represented by $m_k$.

System 100 includes a phasor detector calculation function 112 is coupled to the CORDIC algorithm function 110 receiving generated Phase Modulation (PM) signals $\cos(\Phi_k)$, $\sin(\Phi_k)$, and Amplitude Modulation (AM) signals $m_k$. The phasor detector calculation function 112 provides a combined AM/PM phasor-defect detector output represented by dk. A defect window function 114 coupled to the phasor detector calculation function 112 identifies a defect window on-the-fly.

Figure 2B:
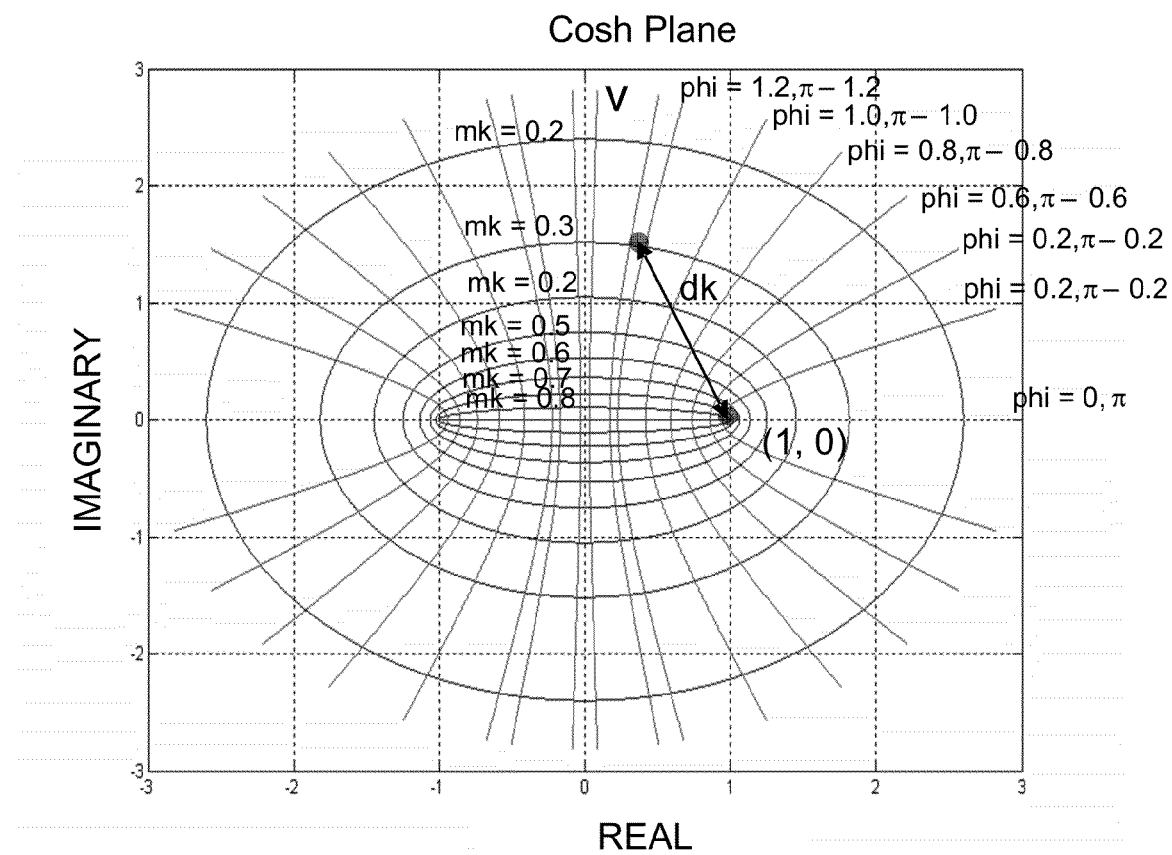

In accordance with features of the embodiments of the invention, the operation of the combined AM/PM phasor detector calculation function 112 is illustrated in illustrated in FIGS. 2A and 2B.

FIG. 2A illustrates example defect detection operations as generally including a CORDIC output 202, a coordinate converter 204, a detection plane 206, the combined AM/PM phasor-defect detector 208 identifying $d_k$, is a distance calculation 208 identifying $d_k$ for magnetic defect location using the combined phase modulation (PM) and amplitude modulation (AM) phasor-defect detector calculation function 112. The distance calculation 208 identifying $d_k$ which is represented by:

$$d_k = ((u_k-1)^2 + v_k^2)^{1/2} = \tfrac{1}{2}(m_k + 1/m_k) - \cos(\phi_k).$$

FIG. 2B illustrates an example new coordinate plane generally designated by the reference character 220, for example, used to locate magnetic defects on-the-fly for hard disk drives (HDDs) in accordance with an embodiment of the invention using the AM/PM phasor-defect detector calculation function 112.

Figure 2C:
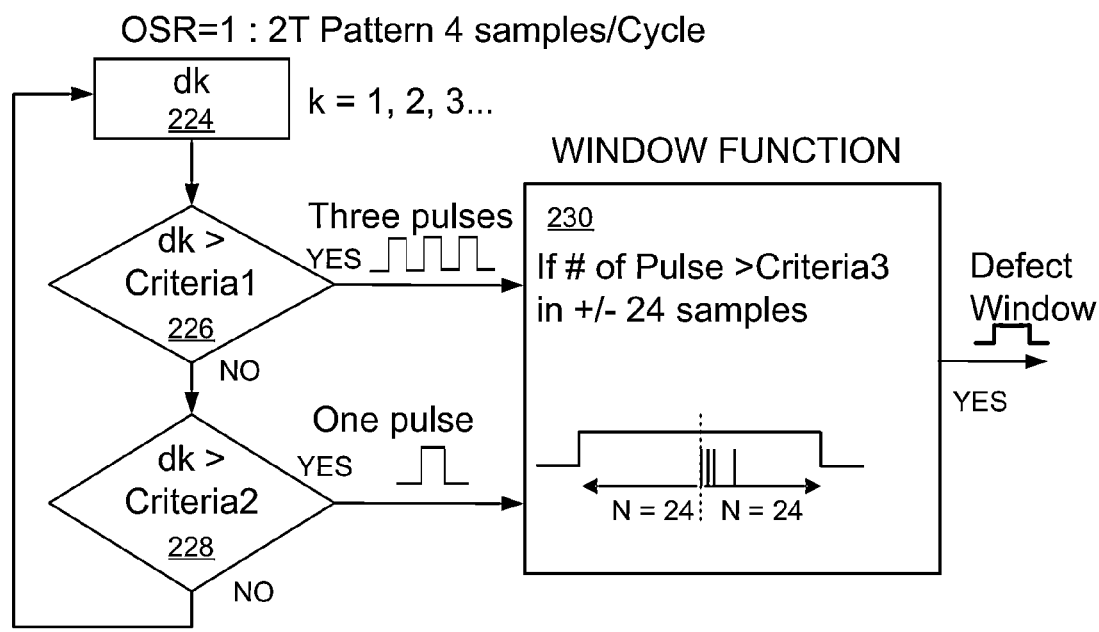

FIG. 2C illustrates an example defect window function 114 to locate magnetic defects on-the-fly for HDDs in accordance with an embodiment of the invention. The defect window function 114, for example for reference uses a value of a plurality of criteria 222; where
(1) If dk>Criteria1; Criteria1=1.0→Three Pulses
(2) If dk>Criteria2; Criteria1=0.45→One Pulse
(3) If # of Pulse>Criteria3 in +/−24 samples→Make this +/−24 samples as Defect Window, Criteria3=3.

With OSR=1: 2T Pattern 4 samples/Cycle, as indicated at a block 224, dk, where k=1, 2, 3 . . . , is identified. As indicated at a decision block 226 where dk>Criteria1, then 3 pulses are provided. As indicated at a decision block 228 dk>Criteria2, then 1 pulse is provided. As indicated at a decision block 230 WINDOW FUNCTION, If # of Pulse>Criteria3 in +/−24 samples, then this +/−24 samples as Defect Window, providing an output Defect Window, as shown in the illustrated example defect window function 114 of FIG. 2C.

Figure 3A:
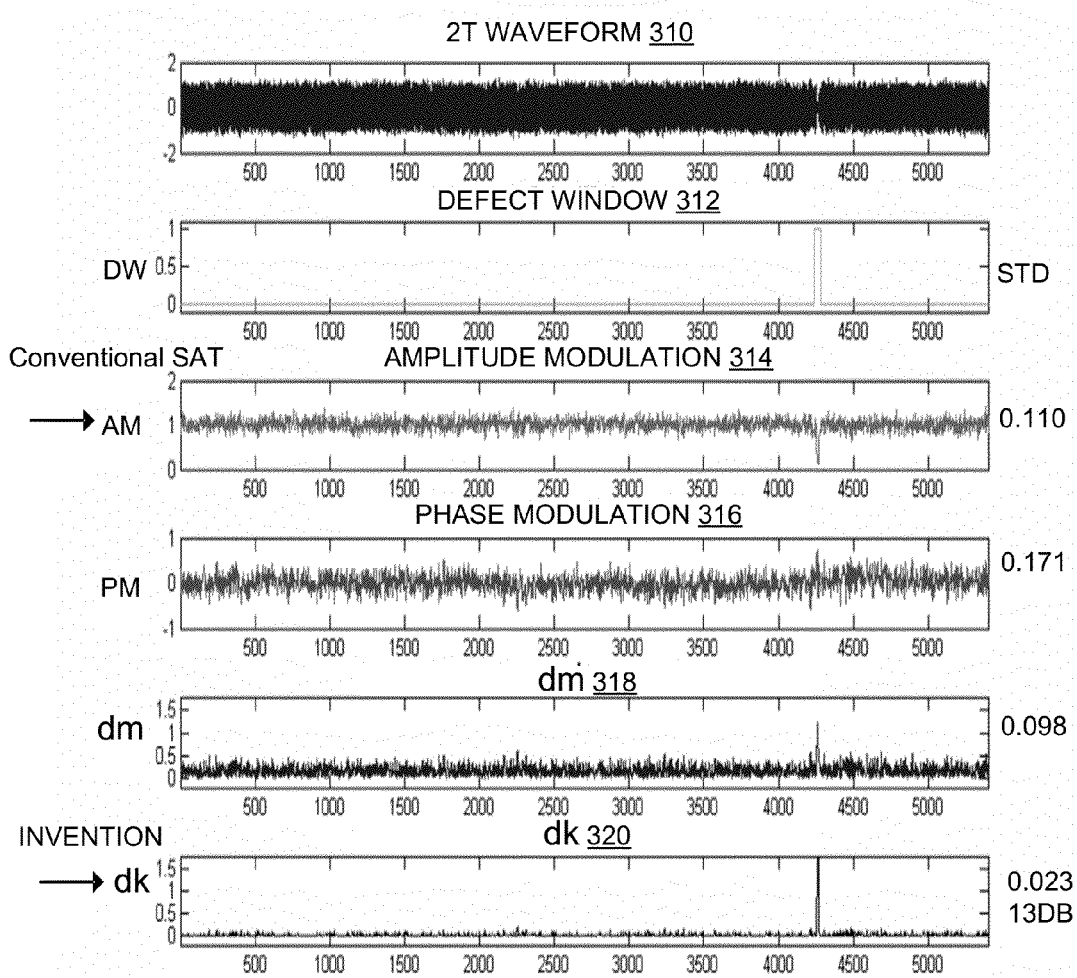
FIGS. 3A and 3B are waveforms illustrating example operations of system for implementing magnetic defect location detection of FIG. 1 in accordance with embodiments of the invention.
Figure 3B:
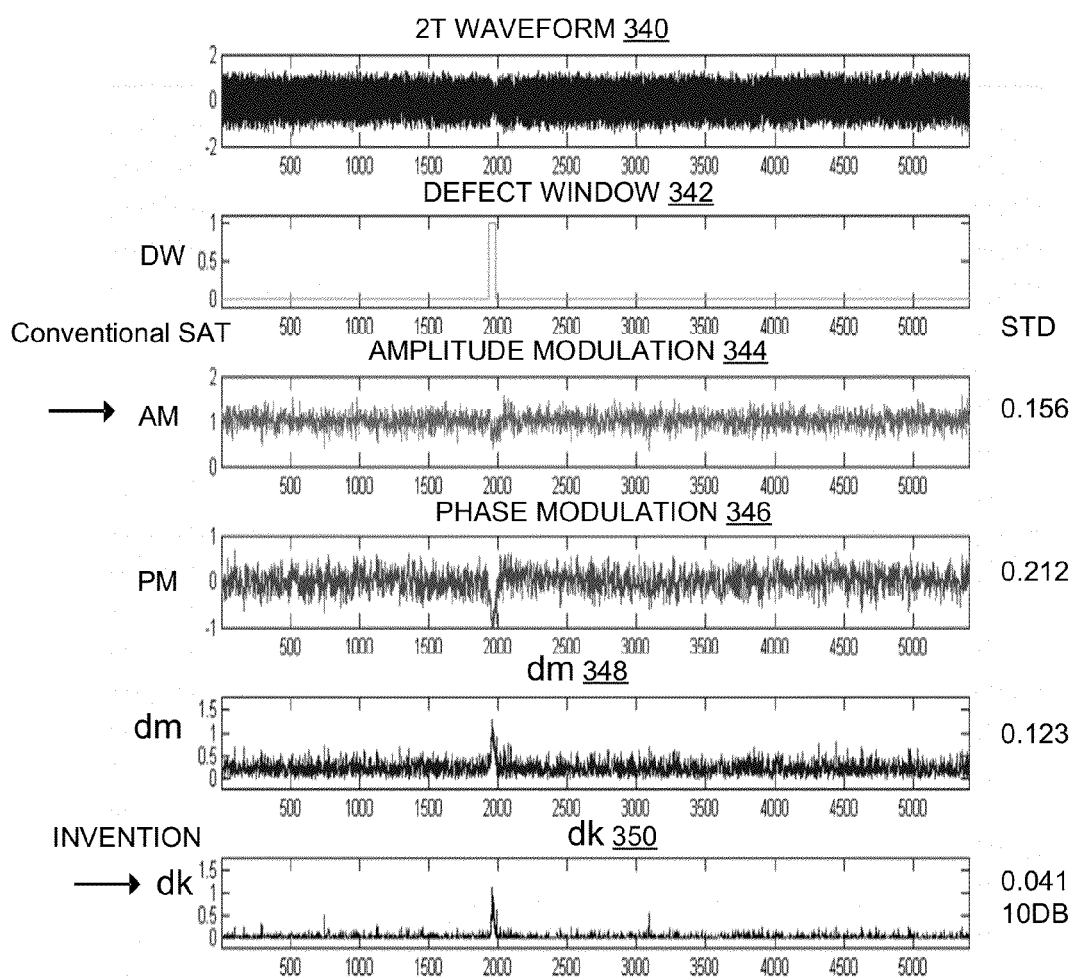

Referring also to FIGS. 3A and 3B, there are shown respective waveforms generally designated by the reference characters 300 and 330 illustrating example operations of system 100 for implementing magnetic defect location detection in accordance with embodiments of the invention.

In FIG. 3A example waveforms 300 include an upper example 2T waveform 310, a defect window 312, an amplitude modulation waveform 314, a phase modulation waveform 316, dm 318, and dk 320 of the present invention. The example waveforms 300 provide a defect example that illustrates a Signal to Noise Ratio (SNR) gain provided by the combined AM/PM detection of system 100 of the invention. The waveform dk 320 of the invention shows a 13 DB gain over the convention SAT detection method using amplitude drop as shown in the amplitude modulation waveform 314.

In FIG. 3B, example waveforms 330 include an upper second example 2T waveform 340, a defect window 342, an amplitude modulation waveform 344, a phase modulation waveform 346, dm 348, and dk 350 of the present invention. The example waveforms 330 provide a defect example that illustrates a Signal to Noise Ratio (SNR) gain provided by the combined AM/PM detection of system 100 of the invention. The waveform dk 350 of the invention shows a 10 DB gain over the convention SAT detection method using amplitude drop as shown in the amplitude modulation waveform 344.

Figure 4A:
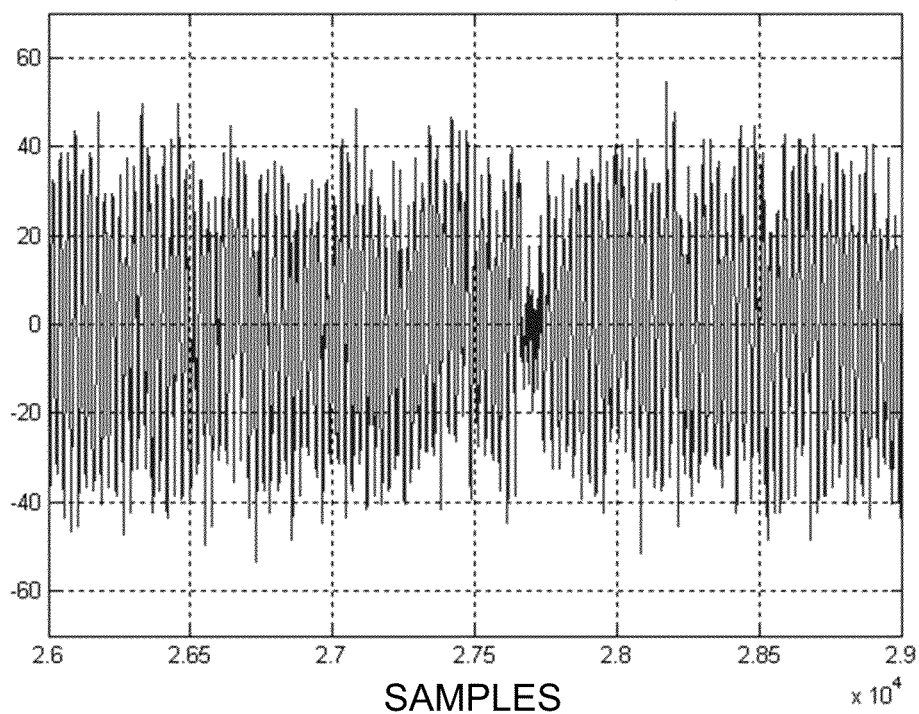
FIGS. 4A, 4B, 4C and 4D are waveforms of example conventional media surface analysis test (SAT) operations where conventional SAT can detect a defect detection range of FIGS. 4A, 4B and where conventional SAT can not detect a defect detection range of FIGS. 4C, 4D.
Figure 4B:
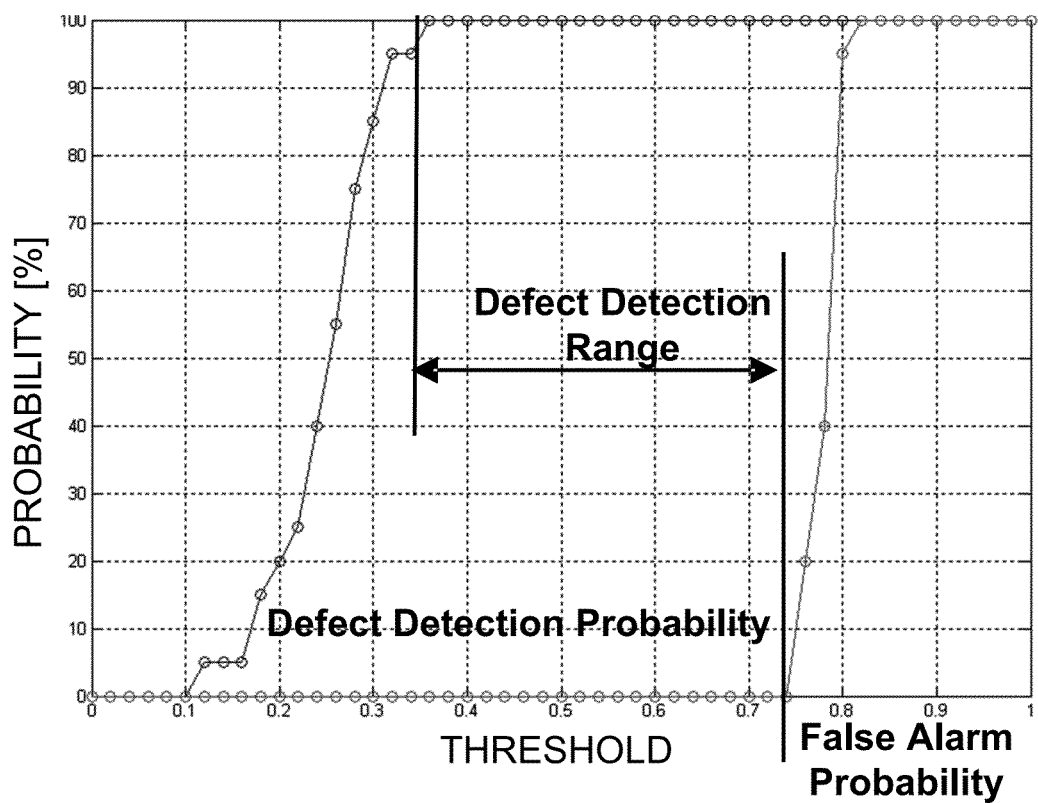
Figure 4C:
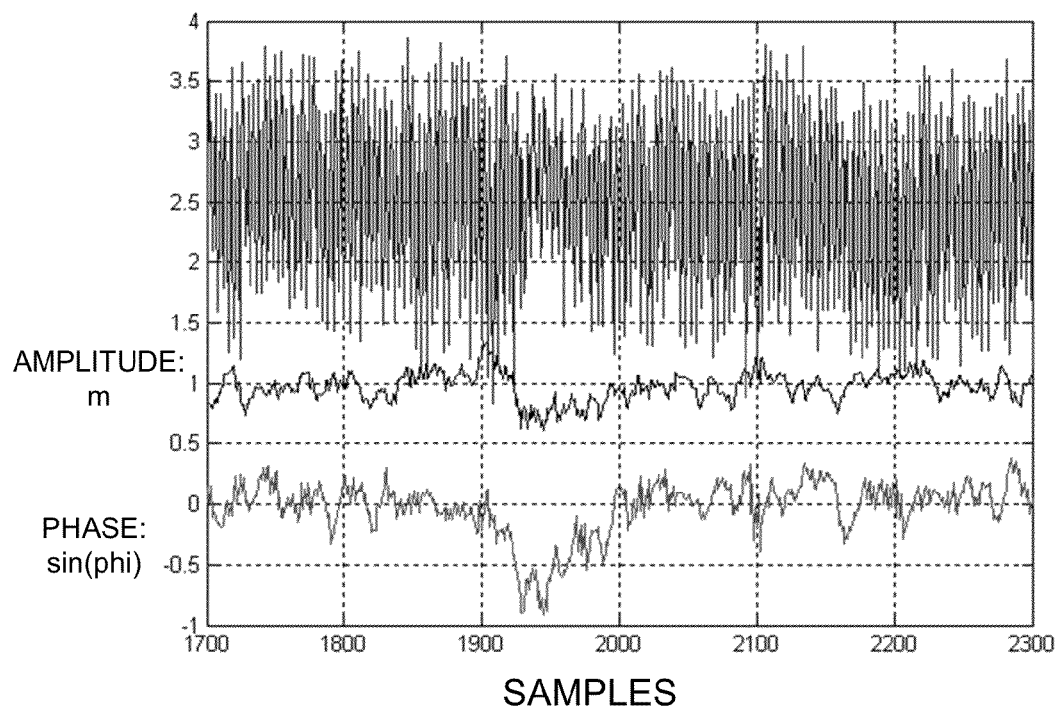
Figure 4D:
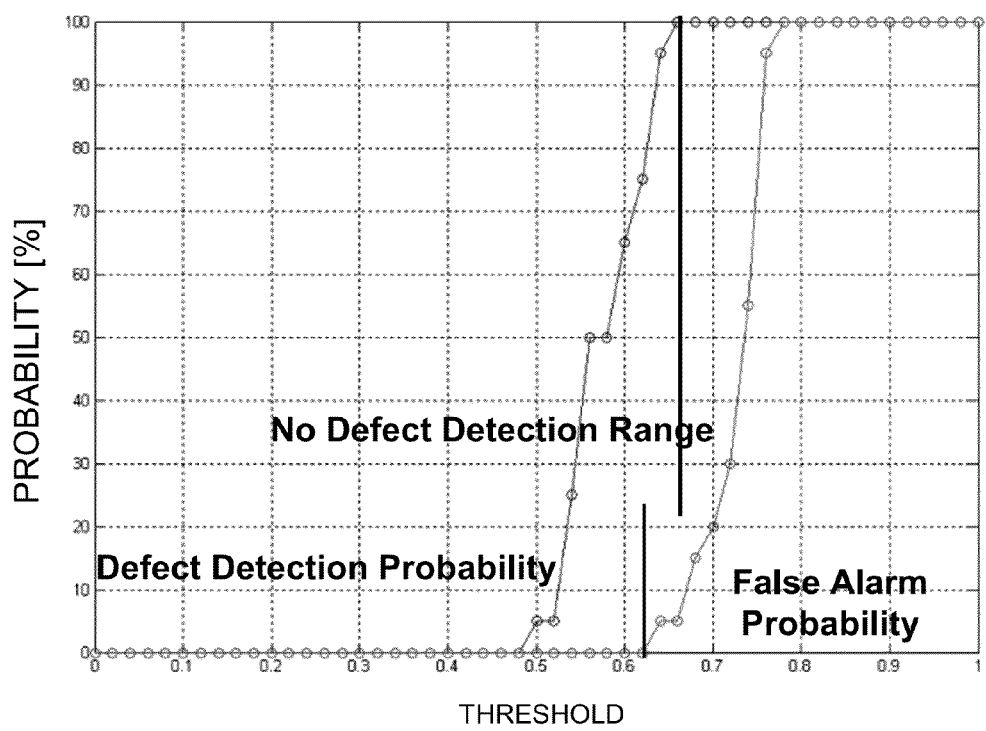

FIGS. 4A, and 4C provide example waveforms 400, 420 corresponding the respective defect examples shown in FIG. 3A and in FIG. 3B. Conventional media surface analysis test (SAT) defect detection range shown in FIG. 4B is sufficient to detect the defect of FIG. 4A, but the conventional SAT defect detection is not sufficient to detect the defect of FIG. 4C as shown in FIG. 4D. By combining the AM and PM components of the defect signal in accordance with the present invention, this defect is detectable. In FIG. 4A, a first example defect waveform generally designated by the reference characters 400 is shown. FIG. 4B illustrates defect detectability and false alarm waveforms generally designated by the reference characters 410 with a defect detection range for the example defect waveform 400 of FIG. 4A. In FIG. 4C, a second example defect waveform generally designated by the reference characters 420 is shown. FIG. 4D illustrates defect detectability and false alarm waveforms generally designated by the reference characters 440 with no defect detection range for the example defect waveform 420 of FIG. 4C.

Figure 5A:
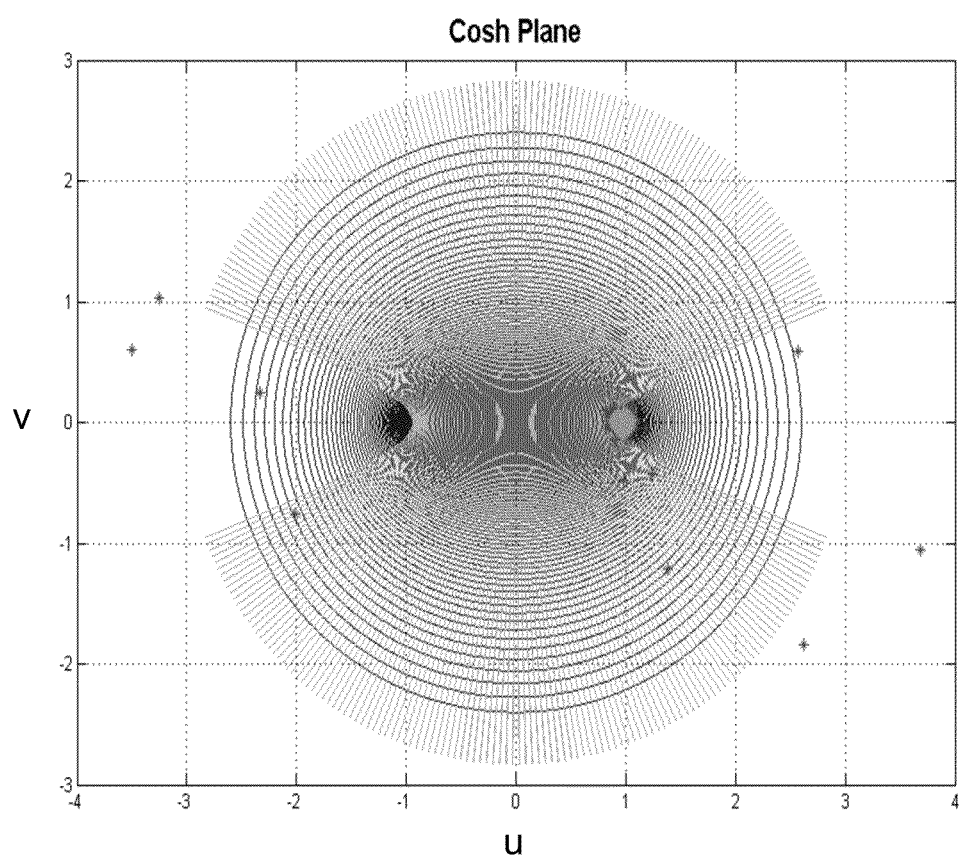
FIGS. 5A and 5B respectively illustrates an example new coordinate plane or Cosh plane corresponding to the example waveforms of FIGS. 4A, and 4C to locate magnetic defects on-the-fly for hard disk drives (HDDs) in accordance with an embodiment of the invention.
Figure 5B:
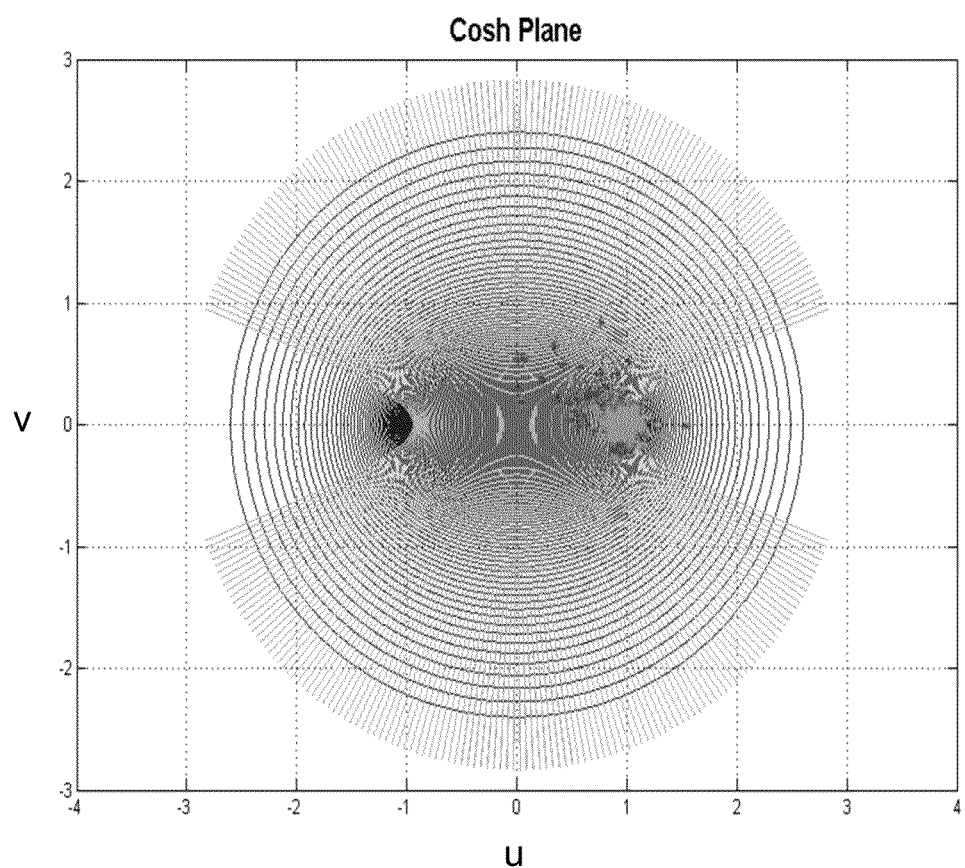

FIGS. 5A and 5B respectively illustrate an example new coordinate plane or Cosh plane generally designated by the respective reference character 500, 520, used to locate magnetic defects on-the-fly for hard disk drives (HDDs) in accordance with an embodiment of the invention using the AM/PM phasor-defect detector calculation function 112. The Cosh plane 500 is generated for the example defect waveform 400 of FIG. 4A. The Cosh plane 520 is generated for the example defect waveform 420 of FIG. 4B. The defect waveform 420 of FIG. 4C shown as undetectable in FIG. 4D become detectable as shown in FIG. 5B using the combined AM and PM detector in accordance with the present invention.

While the present invention has been described with reference to the details of the embodiments of the invention shown in the drawing, these details are not intended to limit the scope of the invention as claimed in the appended claims.

What is claimed is:

1. A method for implementing magnetic defect detection on-the-fly for hard disk drives comprising:
    receiving a readback signal and producing analog-to-digital converter (ADC) readback signal samples;
    processing said ADC readback signal samples and generating Amplitude Modulation (AM) and Phase Modulation (PM) signals; and
    applying said Amplitude Modulation (AM) and Phase Modulation (PM) signals to a combined AM/PM phasor detector calculation function, and
    said combined AM/PM phasor detector calculation function, generating a coordinate Cosh plane, using said generated coordinate Cosh plane for identifying a phasor detection plane, and identifying a detected magnetic defect location in real time.

2. The method for implementing magnetic defect detection as recited in claim 1 wherein processing said ADC readback signal samples and generating Amplitude Modulation (AM) and Phase Modulation (PM) signals includes using a CORDIC algorithm function to perform trigonometric calculations for generating said AM and PM signals, said generated AM and PM signals being represented by $m_k$, $\operatorname{Sin}(\Phi_k)$, and $\operatorname{Cos}(\Phi_k)$.

3. The method for implementing magnetic defect detection as recited in claim 2 includes said combined AM/PM phasor detector calculation function using generated AM signals $m_k$ and PM signals $\operatorname{Sin}(\Phi_k)$, and $\operatorname{Cos}(\Phi_k)$ in a coordinate converter algorithm for generating coordinate converter results including said coordinate Cosh plane.

4. The method for implementing magnetic defect detection as recited in claim 3 includes said combined AM/PM phasor detector calculation function calculating said detected magnetic defect location represented by $d_k$ using said coordinate converter results including said coordinate Cosh plane for generating said phasor detection plane.

5. The method for implementing magnetic defect detection as recited in claim 4 includes said combined AM/PM phasor detector calculation function calculating said detected magnetic defect location represented by $d_k$ using said generated phasor detection plane.

6. The method for implementing magnetic defect detection as recited in claim 1 includes a defect window function coupled to said combined AM/PM phasor detector calculation function identifying a defect window in real time.

7. The method for implementing magnetic defect detection as recited in claim 1 wherein receiving a readback signal and producing analog-to-digital converter (ADC) readback signal samples includes capturing a 2T pattern readback signal, where 1/T is the sample rate.

8. The method for implementing magnetic defect detection as recited in claim 1 wherein said combined AM/PM phasor detector calculation function calculates said detected magnetic defect location in real time, providing an on-the-fly defect window.

9. An apparatus for implementing magnetic defect detection on-the-fly for hard disk drives comprising:
    an analog-to-digital converter (ADC) receiving a readback signal and producing ADC readback signal samples;
    a signal processing circuit coupled to said ADC processing said ADC readback signal samples and generating Amplitude Modulation (AM) and Phase Modulation (PM) signals; and
    a combined AM/PM phasor-defect detector calculation function coupled to said signal processing circuit receiving said Amplitude Modulation (AM) and Phase Modulation (PM) signals, and said combined AM/PM phasor detector calculation function generating a coordinate Cosh plane, using said generated coordinate Cosh plane for identifying a phasor detection plane, and identifying a detected magnetic defect location in real time.

10. The apparatus for implementing magnetic defect detection as recited in claim 9 includes a defect window function coupled to said combined AM/PM phasor-defect detector calculation function, providing an on-the-fly defect window.

11. The apparatus for implementing magnetic defect detection as recited in claim 9 wherein said signal processing circuit includes a CORDIC algorithm function performing trigonometric calculations for generating said AM and PM signals, said generated AM and PM signals being represented by $m_k$, $\operatorname{Sin}(\Phi_k)$, and $\operatorname{Cos}(\Phi_k)$.

12. The apparatus for implementing magnetic defect detection as recited in claim 11 wherein said combined AM/PM phasor detector calculation function using generated AM signals $m_k$ and PM signals $\operatorname{Sin}(\Phi_k)$, and $\operatorname{Cos}(\Phi_k)$ in a coordinate converter algorithm for generating coordinate converter results including said coordinate Cosh plane.

13. The apparatus for implementing magnetic defect detection as recited in claim 12 wherein said combined AM/PM phasor detector calculation function using said generated coordinate converter results including said coordinate Cosh plane for generating said coordinate phasor detection plane.

14. The apparatus for implementing magnetic defect detection as recited in claim 13 wherein said combined AM/PM phasor detector calculation function calculating said detected magnetic defect location represented by $d_k$ using said generated coordinate phasor detection plane.

15. The apparatus for implementing magnetic defect detection as recited in claim 9 wherein said analog-to-digital converter (ADC) receiving said readback signal and producing ADC readback signal samples includes said ADC capturing a 2T pattern readback signal, where 1/T is the sample rate.

16. The apparatus for implementing magnetic defect detection as recited in claim 9 wherein said combined AM/PM phasor detector calculation function calculates said detected magnetic defect location in real time, a defect window function coupled to said combined AM/PM phasor-defect detector calculation function providing an on-the-fly defect window.

17. A system for implementing magnetic defect detection on-the-fly comprising:
    a hard disk drive including at least one recordable magnetic media;
    an analog-to-digital converter (ADC) receiving a readback signal and producing ADC readback signal samples;
    a signal processing circuit coupled to said ADC processing said ADC readback signal samples and generating Amplitude Modulation (AM) and Phase Modulation (PM) signals; and
    a combined AM/PM phasor-defect detector calculation function coupled to said signal processing circuit receiving said Amplitude Modulation (AM) and Phase Modulation (PM) signals, and said combined AM/PM phasor detector calculation function generating a coordinate Cosh plane, using said generated coordinate Cosh plane for identifying a phasor detection plane, and identifying a detected magnetic defect location in real time.

18. The system as recited in claim 17 includes a defect window function coupled to said combined AM/PM phasor-defect detector calculation function, providing an on-the-fly defect window.

19. The system as recited in claim 17 wherein said signal processing circuit includes a CORDIC algorithm function performing trigonometric calculations for generating said AM and PM signals, said generated AM and PM signals being represented by $m_k$, $Sin(\Phi_k)$, and $Cos(\Phi_k)$.

20. The system as recited in claim 17 wherein said combined AM/PM phasor detector calculation function using generated AM signals $m_k$ and PM signals $Sin(\Phi_k)$, and $Cos(\Phi_k)$ in a coordinate converter algorithm for generating coordinate converter results including said coordinate Cosh plane, and said combined AM/PM phasor detector calculation function using said generated coordinate converter results including said coordinate Cosh plane for generating a said coordinate phasor detection plane.

* * * * *